US012701024B1

(12) United States Patent
Soroker et al.

(10) Patent No.: US 12,701,024 B1
(45) Date of Patent: *Aug. 4, 2026

(54) COMMUNICATION BRIDGING IN A REMOTE OFFICE ENVIRONMENT

(71) Applicant: 8x8, Inc., Campbell, CA (US)

(72) Inventors: Andrei Soroker, Campbell, CA (US);
Peter Hizalev, Campbell, CA (US);
Bryan R. Martin, Campbell, CA (US)

(73) Assignee: 8x8, Inc., Campbell, CA (US)

( * ) Notice: Subject to any disclaimer, the term of this patent is extended or adjusted under 35 U.S.C. 154(b) by 58 days.

This patent is subject to a terminal disclaimer.

(21) Appl. No.: 18/393,095

(22) Filed: Dec. 21, 2023

Related U.S. Application Data

(60) Division of application No. 17/959,055, filed on Oct. 3, 2022, now Pat. No. 11,855,795, which is a
(Continued)

(51) Int. Cl.
*H04L 12/18* (2006.01)
*H04L 51/04* (2022.01)
(Continued)

(52) U.S. Cl.
CPC ...... *H04L 12/1827* (2013.01); *H04L 12/1831* (2013.01); *H04L 51/04* (2013.01);
(Continued)

(58) Field of Classification Search
CPC . H04L 12/1827; H04L 12/1831; H04L 51/04; H04L 51/043; H04L 51/046;
(Continued)

(56) References Cited

U.S. PATENT DOCUMENTS 4,837,798 A    6/1989  Cohen et al.
5,379,351 A    1/1995  Fandrianto et al.
(Continued)

OTHER PUBLICATIONS

The Examiners are respectfully referred to the prosecution of the parent applications in this patent family, to which priority is claimed, and which applications issued as U.S. Pat. Nos. 11,855,795, 11,463,271, 10,999,089 and 10,616,156 (No attachment).

*Primary Examiner* — Farzana B Huq
(74) *Attorney, Agent, or Firm* — Vista IP Law Group, LLP

(57) ABSTRACT

Certain aspects of the disclosure are directed to communication bridging among disparate communications formats and/or platforms in a remote communications environment involving first and second user devices. According to a specific example, a method including: using a data communications server to establish communication sessions between a first user endpoint device which uses a first chat-specific communications format and a second user endpoint device which uses a second communications format, wherein the first chat-specific communications format is incompatible with the second communications format; and bridging data communications, via the data communications server and a uniform resource locator, to enable the first user endpoint device to communicate with the second user endpoint device while the first and second user endpoint devices are respectively using the first chat-specific communications format and the second communications format.

15 Claims, 5 Drawing Sheets

Related U.S. Application Data continuation of application No. 17/306,292, filed on May 3, 2021, now Pat. No. 11,463,271, which is a continuation of application No. 16/841,433, filed on Apr. 6, 2020, now Pat. No. 10,999,089, which is a continuation of application No. 15/810,425, filed on Nov. 13, 2017, now Pat. No. 10,616,156.

(60) Provisional application No. 62/555,812, filed on Sep. 8, 2017.

(51) Int. Cl.

| | |
|---|---|
| *H04L 51/043* | (2022.01) |
| *H04L 51/046* | (2022.01) |
| *H04L 51/08* | (2022.01) |
| *H04L 51/56* | (2022.01) |
| *H04L 61/50* | (2022.01) |
| *H04L 65/00* | (2022.01) |
| *H04L 65/1063* | (2022.01) |
| *H04L 65/1069* | (2022.01) |
| *H04L 65/1083* | (2022.01) |
| *H04L 65/403* | (2022.01) |
| *H04L 65/75* | (2022.01) |
| *H04L 67/104* | (2022.01) |
| *H04L 69/08* | (2022.01) |
| *H04L 101/604* | (2022.01) |
| *H04M 7/00* | (2006.01) |
| *H04N 7/14* | (2006.01) |
| *H04N 7/15* | (2006.01) |

(52) U.S. Cl.

CPC .......... *H04L 51/043* (2013.01); *H04L 51/046* (2013.01); *H04L 51/08* (2013.01); *H04L 51/56* (2022.05); *H04L 65/1063* (2013.01); *H04L 65/1069* (2013.01); *H04L 65/1083* (2013.01); *H04L 65/403* (2013.01); *H04L 67/1044* (2013.01); *H04L 69/08* (2013.01); *H04M 7/006* (2013.01); *H04N 7/147* (2013.01); *H04N 7/15* (2013.01); *H04L 61/50* (2022.05); *H04L 65/00* (2013.01); *H04L 65/75* (2022.05); *H04L 2101/604* (2022.05)

(58) Field of Classification Search

CPC ..... H04L 51/08; H04L 51/56; H04L 65/1063; H04L 65/1069; H04L 65/1083; H04L 65/403; H04L 67/1044; H04L 69/08; H04L 61/50; H04L 65/00; H04L 65/75; H04L 2101/604; H04M 7/006; H04N 7/147; H04N 7/15

See application file for complete search history.

(56) References Cited

U.S. PATENT DOCUMENTS

| | | | |
|---|---|---|---|
| 5,410,326 A | 4/1995 | Goldstein | |
| 5,574,964 A | 11/1996 | Hamlin | |
| 5,722,041 A | 2/1998 | Freadman | |
| 5,835,126 A | 11/1998 | Lewis | |
| 5,905,942 A | 5/1999 | Stoel et al. | |
| 6,104,334 A | 8/2000 | Allport | |
| 6,108,687 A | 8/2000 | Craig | |
| 6,202,084 B1 | 3/2001 | Kumar et al. | |
| 6,259,701 B1 | 7/2001 | Shur et al. | |
| 6,275,574 B1 | 8/2001 | Oran | |
| 6,343,313 B1 | 1/2002 | Salesky et al. | |
| 6,441,842 B1 | 8/2002 | Fandrianto et al. | |
| 6,487,585 B1 | 11/2002 | Yurkovic | |
| 6,526,581 B1 | 2/2003 | Edson | |
| 6,611,537 B1 | 8/2003 | Edens et al. | |
| 6,636,594 B1 | 10/2003 | Oran | |
| 7,065,709 B2 | 6/2006 | Ellis et al. | |
| 7,079,495 B1 | 7/2006 | Pearce et al. | |
| 7,103,667 B1 | 9/2006 | Bell et al. | |
| 7,136,930 B1 * | 11/2006 | Leppinen | H04W 4/18 |
| | | | 709/227 |
| 7,203,755 B2 | 4/2007 | Zhu et al. | |
| 7,296,091 B1 | 11/2007 | Dutta et al. | |
| 7,379,968 B2 | 5/2008 | Schuh | |
| 7,394,803 B1 | 7/2008 | Petit-Huguenin et al. | |
| 7,417,989 B1 | 8/2008 | Doran | |
| 7,742,758 B2 | 6/2010 | Guccione | |
| 7,844,670 B2 | 11/2010 | Roskowski et al. | |
| 7,877,266 B2 | 1/2011 | Brydon et al. | |
| 8,060,558 B2 | 11/2011 | Chang | |
| 8,098,807 B2 | 1/2012 | Charish | |
| 8,194,116 B2 | 6/2012 | Cook | |
| 8,498,725 B2 | 7/2013 | Petit-Huguenin | |
| 9,338,221 B2 | 5/2016 | Petit-Huguenin | |
| 9,762,633 B1 | 9/2017 | Petit-Huguenin | |
| 10,616,156 B1 | 4/2020 | Soroker et al. | |
| 2002/0054601 A1 | 5/2002 | Barraclough et al. | |
| 2002/0067405 A1 | 6/2002 | McDiarmid | |
| 2003/0012385 A1 | 1/2003 | Saito | |
| 2003/0063615 A1 | 4/2003 | Luoma et al. | |
| 2003/0112947 A1 | 6/2003 | Cohen | |
| 2004/0078825 A1 | 4/2004 | Murphy | |
| 2004/0263636 A1 | 12/2004 | Cutler et al. | |
| 2005/0021833 A1 | 1/2005 | Hundscheid et al. | |
| 2005/0044503 A1 | 2/2005 | Richardson et al. | |
| 2005/0052338 A1 | 3/2005 | Suzuki et al. | |
| 2005/0099995 A1 * | 5/2005 | Blossom | H04M 7/006 |
| | | | 370/352 |
| 2007/0019645 A1 | 1/2007 | Menon | |
| 2007/0088703 A1 | 4/2007 | Kasiolas et al. | |
| 2007/0211722 A1 | 9/2007 | Subramanian | |
| 2007/0239825 A1 | 10/2007 | Walter | |
| 2007/0294263 A1 | 12/2007 | Punj et al. | |
| 2009/0190585 A1 * | 7/2009 | Allen | H04L 67/10 |
| | | | 370/389 |
| 2010/0125353 A1 | 5/2010 | Petit-Huguenin | |
| 2010/0205540 A1 * | 8/2010 | Gupta | H04N 7/157 |
| | | | 715/753 |
| 2013/0151623 A1 * | 6/2013 | Weiser | H04L 65/104 |
| | | | 709/205 |
| 2014/0115502 A1 * | 4/2014 | Van Wie | H04N 7/157 |
| | | | 709/204 |
| 2014/0267577 A1 | 9/2014 | Weber et al. | |
| 2014/0280995 A1 | 9/2014 | Ezell | |
| 2016/0149970 A1 | 5/2016 | Jacquemot et al. | |
| 2016/0165051 A1 | 6/2016 | Lum et al. | |
| 2016/0212074 A1 * | 7/2016 | Yu | H04N 7/152 |
| 2016/0219093 A1 | 7/2016 | Gangadharan et al. | |
| 2017/0093688 A1 | 3/2017 | Tarricone et al. | |
| 2017/0149849 A1 | 5/2017 | Shaheen | |
| 2017/0324611 A1 | 11/2017 | Singh | |
| 2018/0007102 A1 | 1/2018 | Klein et al. | |
| 2018/0191651 A1 | 7/2018 | Goldberg et al. | |
| 2018/0212788 A1 * | 7/2018 | Iszlai | H04L 12/4641 |
| 2018/0248982 A1 * | 8/2018 | Hubbard | H04L 63/302 |
| 2018/0324149 A1 * | 11/2018 | Sharma | G06F 9/452 |
| 2018/0352303 A1 | 12/2018 | Siddique et al. | |
| 2019/0124513 A1 | 4/2019 | Raleigh et al. | |

* cited by examiner

COMMUNICATION BRIDGING IN A REMOTE OFFICE ENVIRONMENT

OVERVIEW

Computer servers are increasingly being used to provide various services over a network including, but not limited to, Voice over Internet Protocol (VoIP) communication services such as VoIP calls, video conferencing, call exchange servers, packet switching, and traffic management as well as non-VoIP services including, but not limited to: chat messaging, website hosting, remote data storage, remote computing services, virtual computing environments, and social media hosting and/or integration.

The use of VoIP telecommunication services has been widespread and significant in terms of both numbers of users and types of services being made available. This growth may be attributable to any of a wide variety of socio-economic changes such as the mobility of users of these services, the types and reduced costs of portable telecommunication tools, and the ever-evolving technology adapting to the personal and business needs of the telecommunication users. Similarly, many communication platforms (e.g., social media technologies) have been developed, and these communication platforms take many different forms including blogs, business networks, enterprise social networks, forums, microblogs, photo sharing, products/services review, social bookmarking, social gaming, social networks, video sharing, and virtual worlds.

For business entities, the increased use of VoIP telecommunication services has been particularly complex, especially with regard to integrating the various VoIP telecommunication services and communication platforms available to end users. As examples, a VoIP telecommunication service provider, such as 8×8, Inc., can provide such VoIP services to a multitude of business entities each having customized VoIP systems configured to provide telecommunication services to a wide range of employees.

SUMMARY

Various example embodiments are directed to issues such as those addressed above and/or others which may become apparent from the following disclosure concerning systems and methods for communication bridging in a virtual office environment.

Embodiments are directed toward methods for use in telecommunication systems employing a Voice over Internet Protocol (VoIP) server operated by a telecommunication provider, where the VoIP server on the VoIP provider side (e.g., VoIP provider server as commercially available services from 8×8, Inc.), is used to provide VoIP services to a multitude of client entities. Example embodiments describe establishing reliable, bi-directional collaborative environments between different (e.g., disparate) chat rooms (e.g., communication platforms). Examples of the present disclosure are directed toward methods and devices that include an apparatus that is configured and arranged to form a communication bridge from one such chat room to another (disparate) chat room. In such examples, individual users may communicate with other users on disparate chat rooms in real-time via the communication bridge. The ability to form communication bridges may be provided as a commercially available communication bridging service which may be purchased and/or subscribed to by individuals and/or enterprises alike.

The communication bridging service may be provided in a virtual office environment including, for example, virtual desktops, word processing, scheduling service, transcription services, and/or online conferences and file sharing. A virtual office environment can provide a number of different services to end users. Users of the virtual office environment may in some instances, desire to communicate with others (such as colleagues and/or clients) in one format, but in another instance desire to communicate with those same individuals in another format. For example, while communicating with a group of colleagues in a chat room, the users may identify that their efforts would be better served if they spoke directly by voice and/or if they connected in a video conference. Similarly, team members that were connected on a conference call and/or on a video conference may wish to connect in a chat room to quickly share ideas, either during the conference/video call or shortly thereafter. Examples of the present disclosure allow users of a virtual office environment to switch from one format of communication to another, even when using protocol-disparate chat rooms.

In one specific example embodiment according to the present disclosure, certain aspects of the disclosure are directed to communication bridging among disparate communications formats and/or platforms in a remote communications environment involving first and second user devices. In one such example, a method includes: using a data communications server to establish communication sessions between a first user endpoint device which uses a first chat-specific communications format and a second user endpoint device which uses a second communications format, wherein the first chat-specific communications format is incompatible with the second communications format; and bridging data communications, via the data communications server and a uniform resource locator, to enable the first user endpoint device to communicate with the second user endpoint device while the first and second user endpoint devices are respectively using the first chat-specific communications format and the second communications format.

In an example embodiment, a VoIP server is configured and arranged to transmit chat messages between a plurality of disparate chat rooms accessible by end-users of a communication bridging service. In such embodiments, the VoIP server can form such communication bridges by providing a plurality of modules, including a user interface module, an application module, and a database module. The user interface module can be configured and arranged to receive from users of a first chat room, a request to form a communication bridge (e.g., a tube) between the first chat room (such as Slack) and a second chat room (such as Fleep). The database module can be configured and arranged to store configuration data corresponding to the communication bridge, as well as authentication data for users of the respective chat rooms. The application module can form the communication bridge by authenticating end-users of the first chat room and end-users of the second chat room, and forming the communication bridge responsive to authentication of the end-users, in accordance with processes described herein. Once the communication bridge is formed, the application module can transmit messages between users of the first chat room and users of the second chat room according to defined parameters of the communication bridge. The transmitted messages may be viewable in real-time by the users of the first and second platforms in a common interface.

In other specific example embodiments, a VoIP communication server is configured and arranged to transmit chat messages between a plurality of protocol-disparate chat rooms via a virtual office environment. In such examples, the VoIP communication server comprises a virtual service module configured and arranged to provide virtual office services including a communication bridging service and VoIP conference services, in the virtual office environment. The VoIP communication server further includes a user interface module configured and arranged to receive from a user of the communication bridging service, a request to form a communication bridge between a first protocol-disparate chat room and a second protocol-disparate chat room. A uniform resource locator (URL) generation module is configured and arranged to facilitate formation of a communication bridge between the first chat room and the second chat room. The URL generation module facilitates formation of communication bridges by, in response to receipt of a request from a first user, generating a URL for the communication bridge according to the request received from the first user, and identifying a first protocol associated with the first chat room and a second protocol associated with the second chat room. The VoIP communication server further includes an assimilation and processing module configured and arranged to transmit chat messages between the first chat room and the second chat room by receiving from the URL generation module, an identification of the first and second protocols, and translating a message from a participant of the first chat room or from a participant of the second chat room into a translated message using the respective protocols. The assimilation and processing module can then transmit the translated message to the participants of the first chat room and the participants of the second chat room.

In additional example embodiments, a method for transmitting chat messages between a plurality of protocol-disparate chat room in a virtual office environment is provided. Such exemplary methods include receiving at a VoIP server, a request from a first user of the virtual office environment to form a communication bridge between the first chat room and a second protocol-disparate chat room, wherein each of the first and second chat rooms include at least two participants, using a communication bridging service provided in the virtual office environment. The method includes generating a URL for the communication bridge according to the request received, translating chat messages received from participants using specifications for the first and second chat room protocols, and relaying the translated chat messages to the participants of the first and second chat rooms. The method also includes providing a display including communication services available in the virtual office environment, and including selectable options to convert the communication bridge into a communication session using a different communication service provided in the virtual office environment.

The above discussion/summary is not intended to describe each embodiment or every implementation of the present disclosure. The figures and detailed description that follow also exemplify various embodiments.

BRIEF DESCRIPTION OF FIGURES

Various example embodiments may be more completely understood in consideration of the following detailed description and in connection with the accompanying drawings in which.

Figure 1:
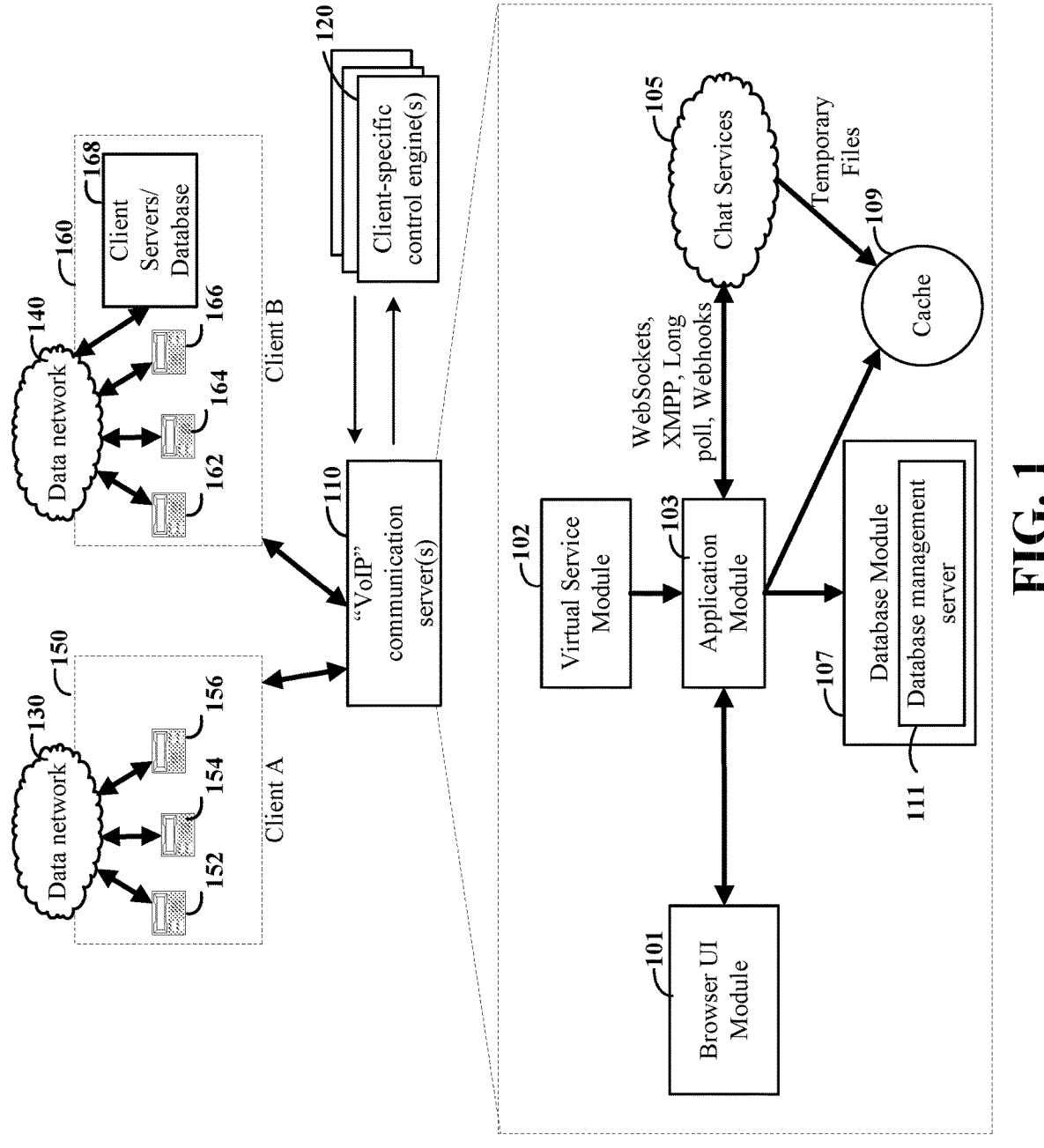
FIG. 1 shows a block diagram of a system for communication bridging in a virtual office environment, consistent with embodiments of the present disclosure.

While various embodiments discussed herein are amenable to modifications and alternative forms, aspects thereof have been shown by way of example in the drawings and will be described in detail. It should be understood, however, that the intention is not to limit the disclosure to the particular embodiments described. On the contrary, the intention is to cover all modifications, equivalents, and alternatives falling within the scope of the disclosure including aspects defined in the claims. In addition, the term "example" as used throughout this application is only by way of illustration, and not limitation.

DETAILED DESCRIPTION

Aspects of the present disclosure are believed to be applicable to a variety of different types of apparatuses, systems and methods involving disparate communication platforms. In certain implementations, aspects of the present disclosure have been shown to be beneficial when used in the context of providing communication services between various users and/or groups of users that may utilize different chat rooms (e.g., communication platforms). Moreover, aspects of the present disclosure have been shown to be beneficial when used in the context of providing Voice over Internet Protocol (VoIP) communication services. While the disclosure is not necessarily limited to chat rooms, chat and/or text message communication, chat rooms (e.g., communication platforms) are used in the following discussion to exemplify certain specific advantageous embodiments. Additionally, while the present disclosure is not necessarily limited to VoIP communication systems as described herein, for purposes of facilitating understanding and appreciation of certain embodiments, the following discussion uses such VoIP-based services and systems in the context and on behalf of a telecommunication system of client entities which subscribe to such services from a VoIP telecommunication service provider (with a server).

Chat rooms can be used to share information via text with a group of other users. Different types of chat rooms offer real-time (or near real-time) text transmission over the Internet. Instant messaging (IM) is one such type. Generally speaking, the ability to converse with multiple people in the same conversation differentiates chat rooms from other messaging programs, which are more typically designed for one-to-one communication. A chat room refers to or includes a computing protocol as may be implemented by a computer processor circuit to facilitate the real-time or real-time transmission of text messages. Chat messages are generally short in order to enable other participants to respond quickly, for example, with message lengths limited in number. Thereby, a feeling similar to a spoken conversation is created, which distinguishes chatting from other text-based online communication forms such as Internet forums and email. Chat room may address point-to-point communication as well as multicast communication from one sender to many receivers. Chat room may also refer to or include any direct text-based and/or video-based (e.g., webcams) communication, one-on-one chat or one-to-many group chat (formally also known as synchronous conferencing), using tools such as instant messengers, Internet Relay Chat (IRC), and talkers. Chat room includes web-based applications that allow communication which is often directly addressed, but anonymous between users in a multi-user environment. The users in a particular chat room are generally connected via a shared interest or another similar connection, and chat rooms exist catering for a wide range of subjects. However, different types of chat rooms (e.g., chat rooms provided by different chat service providers) lack the ability to communicate with one another in real-time. Moreover, advances in technology are providing more and more options for individuals to communicate with one another. Different communication formats are available to individuals, including VoIP, email, texting, PSTN, instant messaging (IM) services, among others, and each of the different communication formats have respective advantages and disadvantages.

Aspects of the present disclosure provide for the creation of bi-directional collaborative environments involving a plurality of chat rooms. As a specific example, one of the embodiments disclosed herein might be used to provide a communication bridge (e.g., a tube) for chat communication between Google Hangouts and Slack. By providing a communication bridge between Google Hangouts and Slack, users of the disparate chat rooms can communicate in real-time despite using different chat rooms implementing different (and perhaps incompatible) communication protocols.

In such examples, the capability to form such communication bridges is provided in a comprehensive system that coordinates multiple communication formats and provides a single, unified interface for use therewith. Accordingly, aspects of the present disclosure relate to systems, methods and devices that are useful for providing a unified communications platform to individuals, groups and businesses. In particular implementations, a user/front-end interface consolidates a number of different features onto a single platform that includes a unified interface which provides the capability for users to create communication bridges between disparate chat rooms and to switch between the various communication formats provided.

As described herein, disparate chat rooms refer to and/or include chat rooms that include or comprise of fundamentally different aspects, and can use different and perhaps incompatible communication protocols. Unlike email servers that may utilize simple mail transfer protocol (SMTP), various chat rooms (e.g., chat room services) and even isolated instances of the same type of chat room lack the ability to communicate with one another as there is no universal protocol for chat communication. In accordance with aspects of the present disclosure, a VoIP computer server is provided which is configured and arranged to form a communication bridge between such Google Hangouts and Slack chat rooms. The VoIP server, as described herein, comprises a user interface (UI) module configured and arranged to receive requests from end-users to form a communication bridge between Google Hangouts and Slack. The VoIP computer server further comprises an application module configured and arranged to transmit chat messages between Google Hangouts and Slack by authenticating end-users of the respective chat rooms, forming the communication bridge according to stored configuration data, and transmitting the chat messages via the communication bridge.

As an illustration, two teams (Team A and Team B) may collaborate on a project, and each team may have chat rooms established to facilitate communication among the team members. Team A can collaborate using Slack, whereas Team B can collaborate using Skype. In accordance with examples of the present disclosure, members of Team A using Slack can communicate with members of Team B using Skype in real-time. In order to facilitate the communication between Team A and Team B, a portal is created which includes a uniform resource locator (URL) that connects Team A and Team B. A member of Team A can create a portal in order to connect with Team B, and provide the URL for the generated portal with Team B. Once a member of Team B connects to the portal via the URL, a communication bridge is formed between Team A and Team B which allows the two teams to communicate with one another in real-time despite using disparate communication platforms. The members of Team A and Team B that facilitate the formation of the communication bridge between the two chat rooms are users of a communication bridging service, such as may be made available by a VoIP service provider.

Each respective portal that is formed has a unique URL that can be shared with any number of teams, such that any number of disparate chat rooms can be connected to one another. When team members of a first chat room connect to the portal of a second chat room via the URL of the respective portal, a communication bridge is formed between the first chat room and the second chat room and messages posted in one of the chat rooms will be posted to the other chat room.

In accordance with examples of the present disclosure, the VoIP server can maintain a set of programming instructions specifying how messages received in one communication protocol can be translated into another communication protocol. Using such programming instructions, messages received from a chat room using a first communication protocol can be translated to a second communication protocol that is accessible by a different chat room, and bilateral communication is facilitated between disparate chat rooms that otherwise would be incapable of communicating with one another in real-time or near real-time. Disparate (e.g., different) chat rooms can use different application programming interfaces (APIs), and each API can differ significantly in terms of communication protocols used. Examples of communication protocols used in chat rooms include webhooks, websockets, hypertext transfer protocol long-polling, and extensible messaging and presence protocol (XMPP), among others. For instance, Slack can use websockets whereas Google Hangouts can use XMPP. Disparate chat rooms may differ in other regards. For instance, each respective type of chat room may differ in terms of transport protocol used, message format used, authentication procedures used, and/or other features. The VoIP server can maintain a set of programming instructions for translating chat messages received from Slack (using websockets) to chat messages compatible with Google Hangouts (using XMPP). In another illustration, the VoIP server can maintain a set of programming instructions for translating chat message received from Skype into chat messages compatible with Fleep, each having different APIs and perhaps using different communication protocols.

As an illustration, in order to facilitate real-time or near real-time chat between users of Google Hangouts and users of Slack over the communication bridge, the VoIP server can implement instructions specific to each chat room (e.g., instructions specific to Google Hangouts, and instructions specific to Slack). In this context, at one end of the communication bridge the VoIP system implements the steps that are taken to access communication with Google Hangouts, with the API used by Google Hangouts. At the other end of the communication bridge where connectivity is to be realized with Slack, the VoIP system implements the steps that are taken to access communication with Slack, with the API used by Slack. The VoIP server facilitates the communication over the communication bridge between Google Hangouts and Slack using particular programming instructions specific to translating messages between Google Hangouts and Slack. In such a manner, a different set of programming instructions may be maintained by the VoIP server for facilitating communication between each of the disparate chat platforms. Once such communication bridge is formed, chat messages can be disseminated in real-time or near real-time between chat rooms that are connected via the communication bridge.

In accordance with examples of the present disclosure, the VoIP server can allow an end-user to select a type of chat platform to use to create a communication bridge. For instance, the URL for a portal can be sent to a third party inviting the third party to form a communication bridge with another chat room, via the URL. Upon receipt of the URL, the VoIP server can provide the third party user with a list of chat platforms which may be selected by the third party user to form a communication bridge. Once the third party user selects a particular chat platform to use, the steps described herein may be employed by the VoIP server to facilitate formation of the communication bridge with the selected chat platform. In some examples, the VoIP server can automatically discover what chat platform the third party is using, and enable formation of a communication bridge with any such chat platform that is discovered.

According to examples of the present disclosure, communication bridges may be created, paused, and deleted using a communication bridging service provided by the VoIP service provider via the VoIP server. The communication bridging service can be provided by the VoIP service provider, and on a fee basis, and via a virtual office environment also provided by the VoIP service provider. Moreover, communication bridges associated with a particular end-user or client of the communication bridging service can be viewed and managed via a management console (e.g., communication bridge management console) provided via the VoIP server. Using the management console, a user may create a communication bridge by creating a portal and sharing the portal URL with various team members as described above. As used herein, a portal refers to or includes a specifically configured website that may be used to form a communication bridge with a particular chat room, and which is associated with a particular URL. For instance, a group of Twitter users communicating in a Twitter chat room, may wish to communicate with a group of users communicating in a Skype chat room. One of the users from the Twitter chat room may create a portal with a particular URL, which can be accessed by the users of the Skype chat room to create a communication bridge between the Twitter chat room and the Skype chat room. In such a manner, the portal and associated URL allow for the formation of communication bridges between disparate chat rooms.

Using the management console, portals and communication bridges associated with a particular user may be managed in a number of ways. For instance, using the management console, the user that established the communication bridge may subsequently pause the communication bridge such that messages that are posted in one of the chat rooms will not post to the other chat rooms while paused. The user can further delete the communication bridge, such that the respective chat rooms are no longer connected and messages will no longer be shared. The user can also delete portals via the management console, thereby preventing any other communication bridges from connecting to the portal, without deleting any of the current communication bridges associated with the portal. In some examples, access to portals may be regulated by an administrator so as to limit who can form a communication bridge using the portal URL. For instance, a temporary code that expires after a threshold period of time (such as fifteen minutes) may be generated when the user of the communication bridging service creates a portal, and the temporary code may be used by other users to access the portal and thereby form a communication bridge. However, after the expiration of the temporary code, additional users may be prohibited from accessing the portal and therefore additional users are prohibited from forming a communication bridge using the portal.

Each disparate chat platform may utilize different respective log in credentials for users. In accordance with examples described herein, the VoIP server may store user credentials for each disparate chat room, such as authentication tokens (OAuth), security tokens, usernames and passwords (or some combination thereof) using envelope encryption. Envelope encryption refers to or includes an encryption algorithm that allows users to store, transfer and use encrypted data by encapsulating data keys (DKs) in an envelope. According to exemplary embodiments described herein, such keys can be managed with a hardened security appliance that establishes a domain as a cooperative collection of trusted entities. The domain includes a set of trusted entities, a set of rules, and a secret key, referred to as a domain key. The domain keys are rotated daily, whereby all existing keys encrypted under the outgoing domain key are re-encrypted under a new domain key.

In another example embodiment, an apparatus includes a VoIP server configured and arranged to form a communication bridge between disparate chat rooms using a secure interface. The apparatus can receive a request from a user of a first chat room to form a communication bridge with a user of a second chat room. In response, the apparatus can authenticate the plurality of users using encrypted user credentials and a particular code identifying the communication bridge to be formed. In example implementations, the apparatus can transmit messages from users of the first chat room to users of the second chat room in a common interface, and in response to such authentication. To ensure that the interface used by the users of each disparate chat room is secure, a separate data key can be issued to encrypt the credentials of each account for the communication bridging service. For instance, an account identifier is associated with a particular communication bridging service account, and a data key is used to encrypt the account credentials. The encrypted account credentials and the data key are combined into an envelope which is stored by the VoIP service provider.

In some embodiments, a presence (or activity) detection circuit is communicatively coupled to the VoIP server. The presence detection circuit receives activity data indicating activity of end-users relative to a software platform (or a "computing platform") that provides various services available over a networked environment (e.g., a virtual office environment). Examples of activity data can include input/ requests in network applications (such as a virtual office environment) that is indicative that a user is active on the network. Some examples of activities can include a user checking/sending email by an end-user, use of scheduling application by an end-user, use of a video conferencing application by an end-user, retrieving files from a file server by the end-user, and an active virtual desktop session of the end-user.

As described herein, the communication bridging service may be provided in such virtual office environment. In particular embodiments, the software platform can be configured to allow users to access features through a web-based portal. For instance, a user can access the software platform through a VoIP server that allows for access using a web browser application. The VoIP server can communicate status information, for users that are accessing the software platform, to the presence detection circuit. For example, the VoIP server can use a protocol such as Extensible Messaging and Presence Protocol (XMPP) for providing the status information.

The VoIP server can provide the users with capability to switch between the various services provided in the virtual office environment. More particularly, the VoIP server can allow users to, via the web browser application, switch from one communication format to another. Users of the virtual office environment may in some instances, desire to communicate with others (such as colleagues and/or clients) in one format, but in another instance desire to communicate with those same individuals in another format. For example, while communicating with a group of colleagues in a chat room, the users may identify that their efforts would be better served if they spoke directly by voice and/or if they connected in a video conference. Similarly, team members that were connected on a conference call and/or on a video conference may wish to connect in a chat room to quickly share ideas, either during the conference/video call or shortly thereafter. Examples of the present disclosure allow users of a virtual office environment to switch from one format of communication to another, even if using protocol-disparate chat rooms.

Accordingly, in the following description, various specific details are set forth to describe specific examples presented herein. It should be apparent to one skilled in the art, however, that one or more other examples and/or variations of these examples may be practiced without all the specific details given below. In other instances, known features have not been described in detail so as not to obscure the description of the examples herein. For ease of illustration, the same reference numerals may be used in different diagrams to refer to the same elements or additional instances of the same element. Also, although aspects and features may in some cases be described in individual figures, it will be appreciated that features from one figure or embodiment can be combined with features of another figure or embodiment even though the combination is not explicitly shown or explicitly described as a combination.

Turning now to the figures, FIG. 1 shows a block diagram of a system for communication bridging (e.g., forming communication bridges) in a virtual office environment, consistent with embodiments of the present disclosure. Such communication bridging may be implemented using a Voice over internet protocol (VoIP) system integrating various telecommunications services. As illustrated in the upper part of FIG. 1, various servers may be included in the VoIP system. These servers implement communication bridging as exemplified in the lower part of FIG. 1. In various embodiments, functionality for implementing the systems or methods of the present invention may be distributed among any number of client and/or server components. For example, various software modules may be implemented by the server(s) for performing various functions in connection with the present invention, and such modules may be implemented to run on server and/or client components.

As illustrated in FIG. 1, the VoIP system includes a VoIP communication server 110 configured to provide VoIP communication for a plurality of endpoint devices 152, 154, 156, 162, 164, and 166 connected in one or more data networks 130 and 140. The endpoint devices are circuit-based instruments that are used by personnel (or users) and include VoIP-enabled circuitry (e.g., IP phones, smart phones, tablets, and/or desktop computers with appropriate VoIP software applications) and/or non-VoIP endpoint devices (e.g., plain old telephone service (POTS) telephones and cellular-capable devices). Each endpoint device is respectively associated with an account of a respective client. Endpoint devices may be associated with a particular client account by registering the endpoint device with a particular client account serviced by the VoIP communication server. Registered devices for each client account may be listed in a respective account settings file (not shown) stored by the VoIP communication servers 110. In this example, endpoint devices 152, 154, and 156 are associated with an account 150 for a first client A and endpoint devices 162, 164, and 166 are associated with an account 160 for a second client B.

The system includes one or more processing circuits configured to implement client-specific control engines 120, which are configured to adjust the VoIP communication provided for each client account according to a respective set of control directives. For instance, the client-specific control engines 120 may adjust routing of a VoIP communication for a client account by generating client-specific sets of control data to the VoIP communication server 110.

Different embodiments may implement the client-specific control engines 120 in various locations. For example, client-specific control engines 120 for one or more client accounts may be implemented in a central server connected to, or incorporated with, the VoIP communication server(s) 110. Additionally or alternatively, one or more client-specific control engines 120 may be implemented by one or more processing circuits maintained by the client (e.g., server/database 168). Similarly, the control directives may be stored locally within the client-specific control engines, or stored remotely (e.g., in a centralized database, in a database maintained by the client or a combination thereof).

As previously described, client-specific control engines may be used to facilitate adjustment of a variety of remote services including, for example, VoIP communication services such as VoIP calls, audio and/or video conferencing, private branch exchange servers, packet switching, chat, and traffic management as well as non-VoIP services including, but not limited to, website hosting, remote data storage, remote computing services, and virtual computing environments. One or more of such services may be provided, for example, by a cloud computing network having one or more servers configurable for a plurality of clients.

As illustrated in the lower portion of FIG. 1, various example embodiments may include a VoIP communication server having a plurality of modules. The system (via the VoIP communication server 110) can include a user interface (UI) module 101, an application module 103, and a database module 107, among other components. The database module 107 stores metadata such as external chat service identity details (e.g. credentials, email, etc.), communication bridge and portal definitions as well as miscellaneous metadata including security logs and/or authorization handshake states. The database module 107 may include a relational database management system (RDMS) which stores data securely and returns that data in response to requests from other applications, as implemented by a database management server 111. For instance, the database module 107 may return data to the application module 103 in response to requests from the application module 103. The database module 107 may include and/or interface with a database management server 111 such as a postgres server, with a multiple availability zones (e.g., multi-AZ) configuration. In a multi-AZ configuration, the RDMS automatically provisions and maintains a synchronous standby replica of data in a different isolated location known as an availability zone. In such configurations, a primary database instance is synchronously replicated across availability zones to create a standby replica which provides data redundancy, eliminates input/output (I/O) freezes, and minimizes latency spikes during system backups. For example, the database module 107, via a RDMS with a multi-AZ configuration may store metadata associated with communication bridges, portals, and/or end-users of a communication bridging service across a plurality of storage locations (e.g., availability zones). By implementing a multi-AZ configuration, the database module 107 maintains a synchronous standby replica of the metadata (e.g., external chat service identity details, communication bridge and portal definitions, security logs, authorization handshake states, etc.).

Additionally, the database module 107 can provide encryption of the stored metadata in a user-configurable manner. For instance, end-users and/or administrators of the communication bridging service may specify a manner in which data associated with portals, communication bridges, particular end-users, and/or a plurality of end-users (e.g., an enterprise) is encrypted. An end-user and/or administrator may specify that volumes in the RDMS may be encrypted at rest in response to selection of an encryption option for the RDMS. Data that is encrypted (e.g., at rest and/or during operation) includes the underlying volumes in the relational database, automated backups of the volumes in the relational database, replicas of the volumes in the relational database, and snapshots.

Referring again to FIG. 1, the system (via the VoIP communication server 110) includes an application module 103 that relays messages between chat services 105 according to communication bridge definitions. To achieve this, the application module 103 may open and maintain active connections with chat rooms that use duplex communication protocols such as WebSockets, extensible messaging and presence protocol (XMPP), and/or long poll. For example, in order to route communication between chat rooms in real-time or near real-time, the application module 103 can listen for incoming hypertext transfer protocol (HTTPS) requests as may be utilized by webhook-based chat services. Webhooks refer to or include program code executable to cause events on one site to invoke specified behavior on another computer. Webhooks can be triggered by an event, such as pushing code to a repository or a comment being posted to a blog, and when that event occurs, the source site makes an HTTP request to the URI configured for the webhook performs the specified behavior. As may be implemented by application module 103, when a chat message is received from an endpoint device associated with a client, such as endpoint device 152, the chat room of the chat message can be identified. The application module 103 may then determine if the identified chat room corresponds to a chat room in any presently-defined and active communication bridge. In response to a determination that the identified chat room corresponds to a chat room that is part of a presently-defined and active communication bridge, the received chat message is relayed to all other chat rooms that belong to the communication bridge. In such a manner, the chat message received via the first chat room (e.g., communication platform) is routed to all chat rooms that are connected to the first chat room via the communication bridge. To perform such routing, the application module 103 maintains a topology cache 109 that includes the set of all connected chat rooms. The topology cache may include communication bridges with chat rooms used by end-users external to an enterprise and/or internal to an enterprise. In such a manner, end-users are able to communicate with both internal and external team members across disparate chat rooms and in real-time or near real-time. Whenever communication bridges are added, removed, activated, and/or deactivated, this topology cache 109 is updated correspondingly to ensure correct routing.

The UI module 101 includes various aspects that allow end-users of the VoIP system to manage the various communication bridges and portals available to the end-users. According to various embodiments, the UI module 101 is configured and arranged to generate a communication bridge homepage and a communication bridge management console accessible by end-users. The management console enables agents (e.g., users of the communication bridging service) to provision identities by varying methods. In some examples, the management console is configured and arranged to authenticate identities with corresponding chat services using a token-based authentication and authorization protocol (such as OAuth, for instance). Additionally and/or alternatively, the management console is configured and arranged to authenticate identities with custom credentials. When authenticated, agents (e.g., users of the communication bridging service) are able to manage (e.g., create, delete, pause, and play) their communication bridges and portals, as well as manage subscriptions to the service providing the communication bridge capabilities.

In an example embodiment, the UI module 101 is implemented by various high-level programming languages. For example, the UI module 101 may be implemented in TypeScript, a typed variation of JavaScript that translates into plain JavaScript. Similarly, the UI module 101 may use a JavaScript library such as React for building the UIs and a modular application architecture such as Flux for building end-user side web applications. Using the various high-level programming languages, the UI module 101 is configured and arranged to generate a single page application (SPA), which is transmitted to the application module 103 and subsequently provided to the respective end-users via the VoIP communication server(s) 110. An SPA refers to a web application that loads a single hyptertext markup language (HTML) page and dynamically updates that page as a user interacts with the application. Examples are not necessarily limited to the scripting languages provided. For instance, exemplary aspects may be implemented using various scripting languages including Postgres PL/pgSQL for the database module 107, Erlang for the application module 103, Typescript for the UI module 101, as well as Node.js and/or Bash for the UI module 101, among others.

In the example shown in FIG. 1, the system includes a virtual service module 102. The virtual service module can be configured and arranged to provide virtual office services, including the communication bridging service and VoIP conference services in the virtual office environment. Such VoIP conference services refer to or include voice call functionality, video conference functionality, and other VoIP services described herein. Similarly, the virtual service module 102 is configured and arranged to convert communication sessions in one format, into communication sessions in a different format. For example, the virtual service module 102 can convert a communication bridge that includes team A and team B, into a video conference including teams A and B, or a voice conference including teams A and B. Similarly, the virtual service module 102 can convert an existing video conference or voice conference into a chat session using a communication bridge. In such a manner, the virtual service module 102 is configured and arranged to provide virtual office services including virtual desktop services, word processing capabilities, scheduling services, transcription services, online conferencing, file sharing, VoIP services, chat services, and communication bridging services, and to enable users of the virtual office environment to switch from one communication formation to another with ease.

Figure 2A:
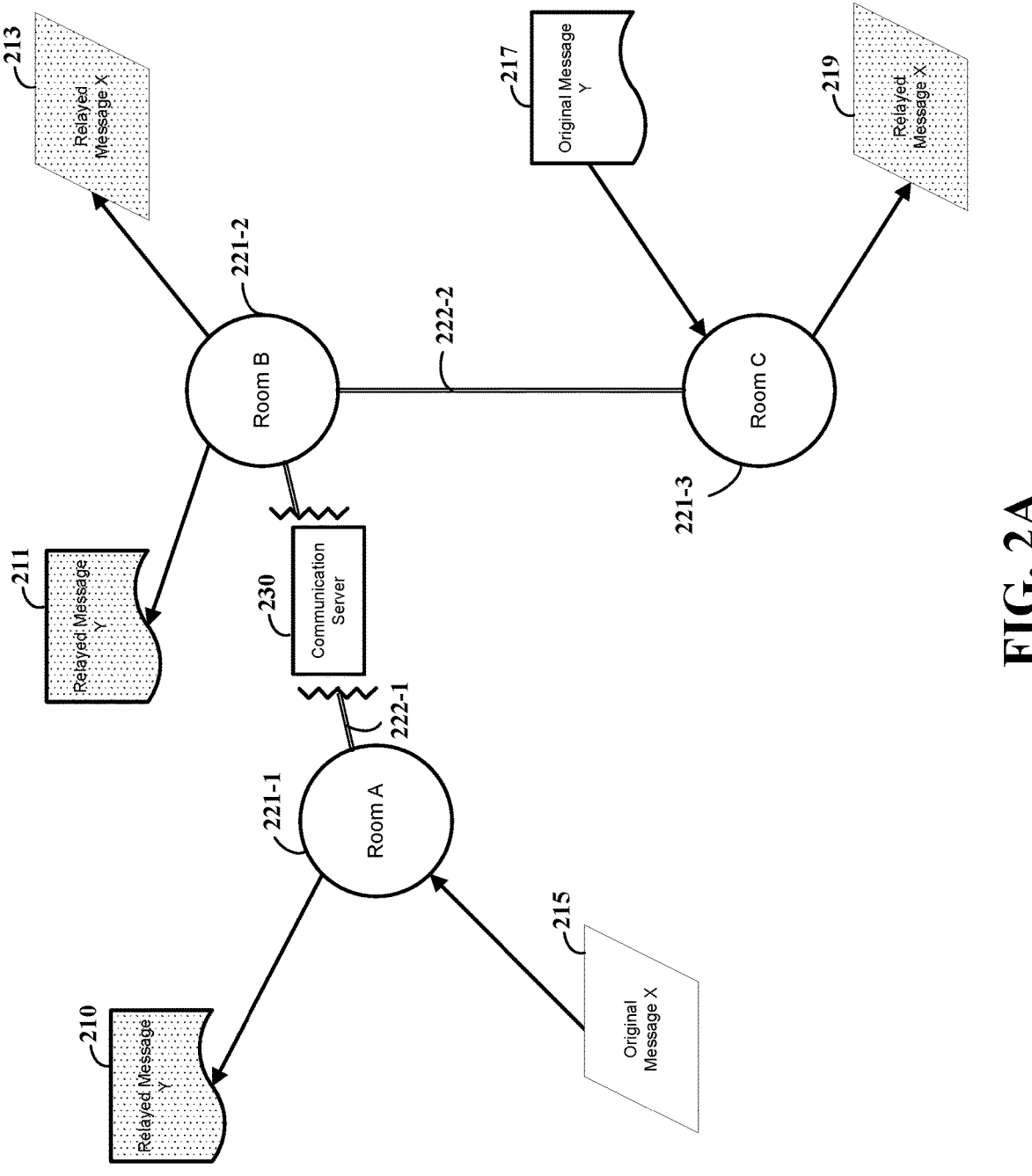
FIG. 2A shows a flow diagram for transmission of messages between disparate communication platforms, consistent with embodiments of the present disclosure.

Exemplary embodiments may include use of two-way bridges, or "communication bridges," between different chat rooms as illustrated in FIG. 2A. Seen in FIG. 2A, communication bridges 222-1 and 222-2 may connect various chat rooms 221-1, 221-2, and 221-3 (room A, room B, and room C, respectively). A communication bridge connects two chat rooms or channels into a virtual connection. Communication bridges can be arranged in an arbitrary topology. Each room retains its own copy of chat history, making chat-based cross-company communication compliant. For example, a group of end-users utilizing a first chat room corresponding to chat room A (221-1) can designate a channel corresponding to communication bridge 222-1 for communicating with end-users utilizing a second chat room corresponding to chat room B (221-2). The communication bridge 222-1 can be used to facilitate chat communication between room A and room B, while allowing each of room A and room B to retain a copy of the chat history. Additionally, because room B is also connected to room C (221-3) via communication bridge 222-2, messages sent from end-users of room A to room B are also sent to end-users of room C. In such a manner, message 215 (original message X) may be transmitted to users connected to rooms 221-2 and 221-3, resulting in users receiving relayed messages 213 and 219 (respectively). Because each of room A, room B, and room C are connected via communication bridges 222-1 and 222-2, respectively, chat messages may be shared across each of the plurality of rooms, and message 217 (original message Y) may be transmitted to users connected via chat rooms 221-1 and 222-2, resulting in users receiving relayed messages 210 and 211 (respectively). As illustrated in FIG. 2A, a communication server 230 (such as a VoIP communication server) can facilitate the communication between room A 221-1 and room B 221-2, as discussed with regard to FIG. 2B.

Example embodiments allow for the creation of reliable, bi-directional collaborative environments involving unrelated organizational units using different chat rooms. Such example embodiments allows teams to talk to each other without switching chat rooms. For example, if a team on a first platform (such as Slack) has to collaborate with a team that uses a second platform (such as HipChat), it is not uncommon for both teams to use a third platform (such as Skype) in addition to their main chat application. In accordance with example embodiments described herein, a channel in Slack can be shared with a room in HipChat, ensuring that both teams keep using their main chat application without having to switch platforms, both teams own a copy of the communication record (i.e., chat history), and each team controls access to their side of the shared communication environment.

Figure 2B:
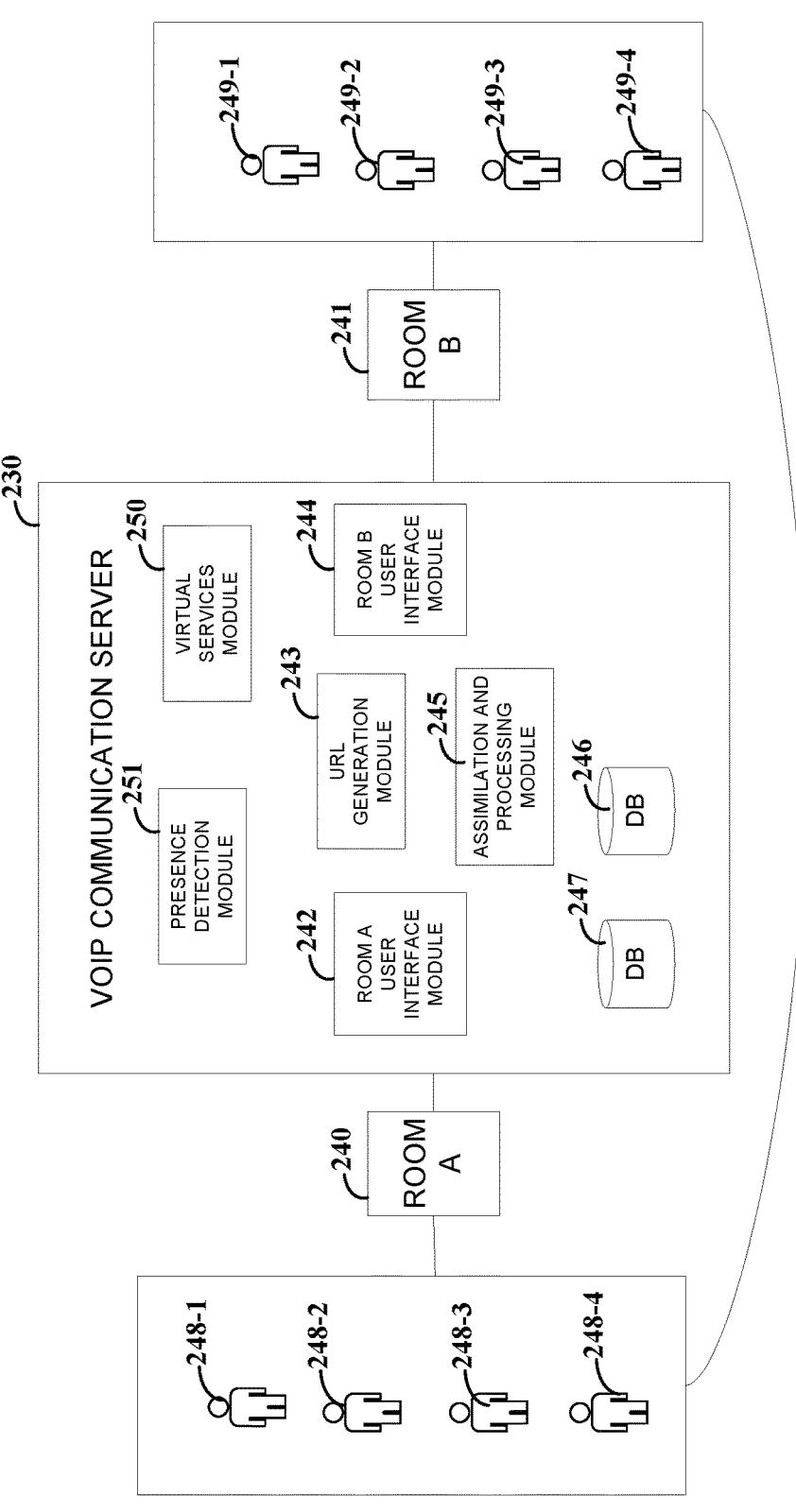
FIG. 2B shows a block diagram of a system for transmitting chat messages between a plurality of disparate chat rooms, consistent with embodiments of the present disclosure.

Exemplary embodiments may include use of a VoIP communication server that is configured and arranged to transmit chat messages between a plurality of disparate chat rooms, as illustrated in FIG. 2B. The VoIP communication server 230 can include a first user interface (UI) module 242 that is configured and arranged to receive from a first user of the virtual office environment, a request to form a communication bridge between a first chat room and a second disparate chat room. For instance, user 248-1, who is using room A 240 to communicate with participants 248-2, 248-3, and 248-4 can submit a request to the VoIP communication server 230 to form a communication bridge between room A 240 and room B 241. In such a manner, the VoIP communication server 230 can include a first UI module 242 configured and arranged to interface with participants of room A 248-1, 248-2, 248-3, and 248-4 (referred to collectively as room A participants 248), and a second UI module 244 configured and arranged to interface with participants of room B 249-1, 249-2, 249-3, and 249-4 (referred to collectively as room B participants 249). In some examples, the user interface modules can be configured and arranged to provide a unified interface displaying to the respective users, the virtual office services provided in the virtual office environment. Such unified interface can provide options selectable by users to convert a communication session into a communication session in a different format. For example, the unified interface allows users to convert a formed communication bridge into a communication session using a virtual office service other than the communication bridging service yet including the same participants. Although FIG. 2B illustrates two separate user interface modules (e.g., user interface module 242 and user interface module 244), examples of the present disclosure may include a single user interface module.

The VoIP communication server 230 can also include a uniform resource locator (URL) generation module 243 configured and arranged to facilitate formation of the communication bridge. The URL generation module 243 can facilitate formation of the communication bridge by generating a URL associated with the communication bridge in response to receipt of the request, and identifying a first chat room protocol associated with the first chat room and a second chat room protocol associated with the second chat room. For instance, the URL generation module 243 can access databases 247 and 246 to identify the chat room protocols used by each of room A 240 and room B 241. As described herein, the first chat room protocol and the second chat room protocol may differ in terms of transfer protocol used, message format used, and/or authentication process used, etc. Once the URL is generated, the second UI module 244 can convey the generated URL to a second user of the virtual office environment. The second user (e.g., the user of room B to which the URL is sent) is a user of the virtual office environment provided by the VoIP communication server 230, and can be among the room B participants 249. Although not illustrated, in some examples, each of UI modules 242 and 244 may form at least a part of browser UI module 101 illustrated in FIG. 1.

The VoIP communication server 230 also includes an assimilation and processing module 245 configured and arranged to transmit chat messages between the first chat room and the second chat room. Although not illustrated, each of the URL generation module 243, the assimilation and processing module 245, the presence detection module

251, and the virtual service module 250 may form at least a part of the application module 103 illustrated in FIG. 1. The assimilation and processing module 245 receives from the URL generation module 243, an identification of the first chat room protocol and the second chat room protocol (as identified from databases 247 and/or 246), and accesses a database (e.g., 247 and/or 246) storing specifications for the first chat room protocol and the second chat room protocol. The databases 246 and 247 may be managed by the database module 107 illustrated in FIG. 1, for instance, by the database management server 111. In response to receipt of a message from a room A participant 248 or from a room B participant 249, the assimilation and processing module 245 translates the received message into a new message (e.g., translated message) using the specifications for the first chat room protocol and the second chat room protocol. The VoIP communication server 230 can then transmit the new message to the participants of room A and the participants of room B.

The VoIP communication server 230 can also include a virtual services module 250 that is configured and arranged to provide virtual office services including a communication bridging service and VoIP conference services, in a virtual office environment. The virtual services module 250 can provide virtual office services including virtual desktop services, word processing capabilities, scheduling services, transcription services, online conferencing, file sharing, VoIP services, email capabilities, and chat capabilities, among others. Moreover, the virtual services module 250 is configured and arranged to convert existing communication sessions in one format (such as voice conference) into a communication session in another format (such as chat). For instance, the virtual service module 250 can initiate, from the communication bridge, a video conference involving the participants of the first chat room (e.g., room A 240) and the participants of the second chat room (e.g., room B 241), by receiving a request from the first user or the second user to initiate a video conference including the participants of the communication bridge, generating a new URL associated with the video conference in response to the request, and distributing the new URL to the participants of the first chat room and the participants of the second chat room. In another example, the virtual service module 250 can initiate, from the communication bridge, a voice conference involving the participants of the first chat room (e.g., room A 240) and the participants of the second chat room (e.g., room B 241), by receiving a request from the first user or the second user to initiate a voice conference including the participants of the communication bridge, and distributing voice conference information to the participants of the first chat room and the participants of the second chat room in response to the request. For example, conference call information, provided by the VoIP service provider, may be provided to each of the participants of room A and room B such that the participants can continue their conversation in voice rather than in chat.

In some examples, the VoIP communication server 230 further includes a presence detection module 251. The presence detection module 251 is configured and arranged to receive activity data indicating activity of users in the virtual office environment and receive event messages indicating changes in statuses of the users. Such presence status information can be used by the VoIP communication server 230 in providing virtual office services to the end users. For example, in response to a determination that the user of the second chat room has an available presence status, the VoIP communication server 230 can generate a URL for the communication bridge according to the request received from the first participant. In another example, the VoIP communication server 230 can delay generation of the URL for the communication bridge, in response to a determination that the user of the second chat room does not have an available presence status. The generation of the URL may be delayed until the user of the second chat room is available to authenticate and/or accept a request to form a communication bridge, and/or a different user may be selected to authenticate and/or accept the request to form the communication bridge between disparate chat rooms.

The presence statuses of users may be used by various network applications that provide services for the users. For example, the VoIP communication server 230 may be configured to display presence statuses of users in a directory. As another example, the presence status of users may be used by a scheduling application to determine available time for meetings between a number of participants. As another example, presence statuses of users may be used to coordinate operations between multiple messaging services in the virtual office environment.

Figure 3:
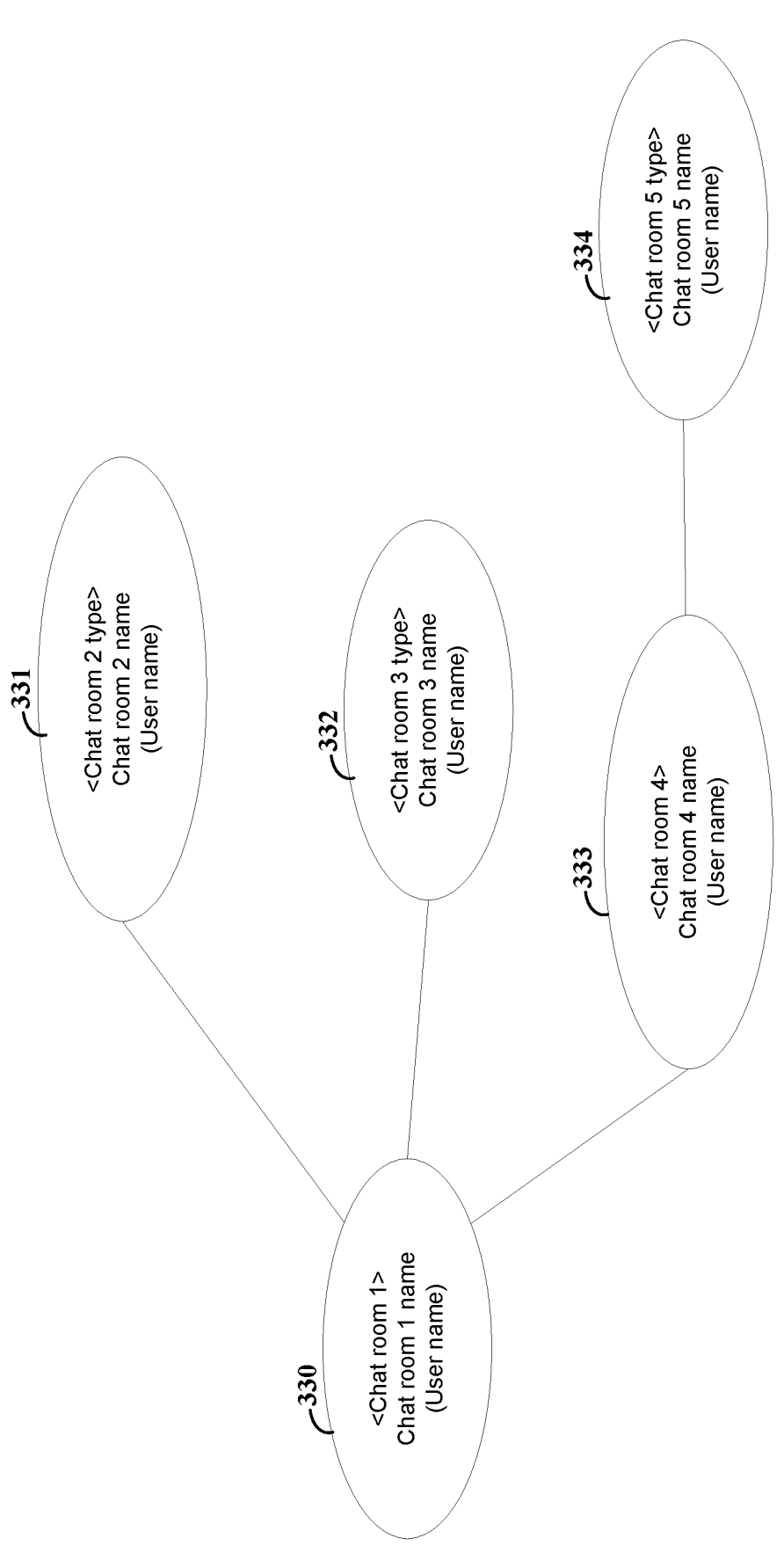
FIG. 3 shows a topology of connected of connected chat rooms, consistent with embodiments of the present disclosure.

As illustrated in connection with FIG. 3 (and consistent with the system illustrated in FIG. 1), in additional example embodiments the system may be used to connect groups on the same chat room, but from different organizational units, such as different teams or on different respective servers, or for connecting more than two teams. Each of chat rooms 330, 331, 332, and 333 may operate on different chat rooms. For instance, room 330 may operate on Fleep, room 331 may operate on Intellinote, room 332 may operate on Slack, and room 333 may also operate on Slack. When an end-user in chat room 330 posts a message, the message is posted to the other four chat rooms (e.g., 331, 332, 333, 334) in real-time. As described with regard to FIGS. 1, 2A and 2B, messages from one chat room are communicated to the other chat rooms via a communication bridge created between the respective chat rooms. In some embodiments, a graphical user interface (GUI) illustrating the connections between various chat rooms can be provided to end-users. Similar to that which is illustrated in FIG. 3, such GUI may illustrate the various communication bridges between the disparate chat rooms and data associated with each disparate chat room. The GUI illustrating the communication bridges formed can include identification of the chat platform used, the name of the chat room, and a user name associated with the chat room.

Figure 4:
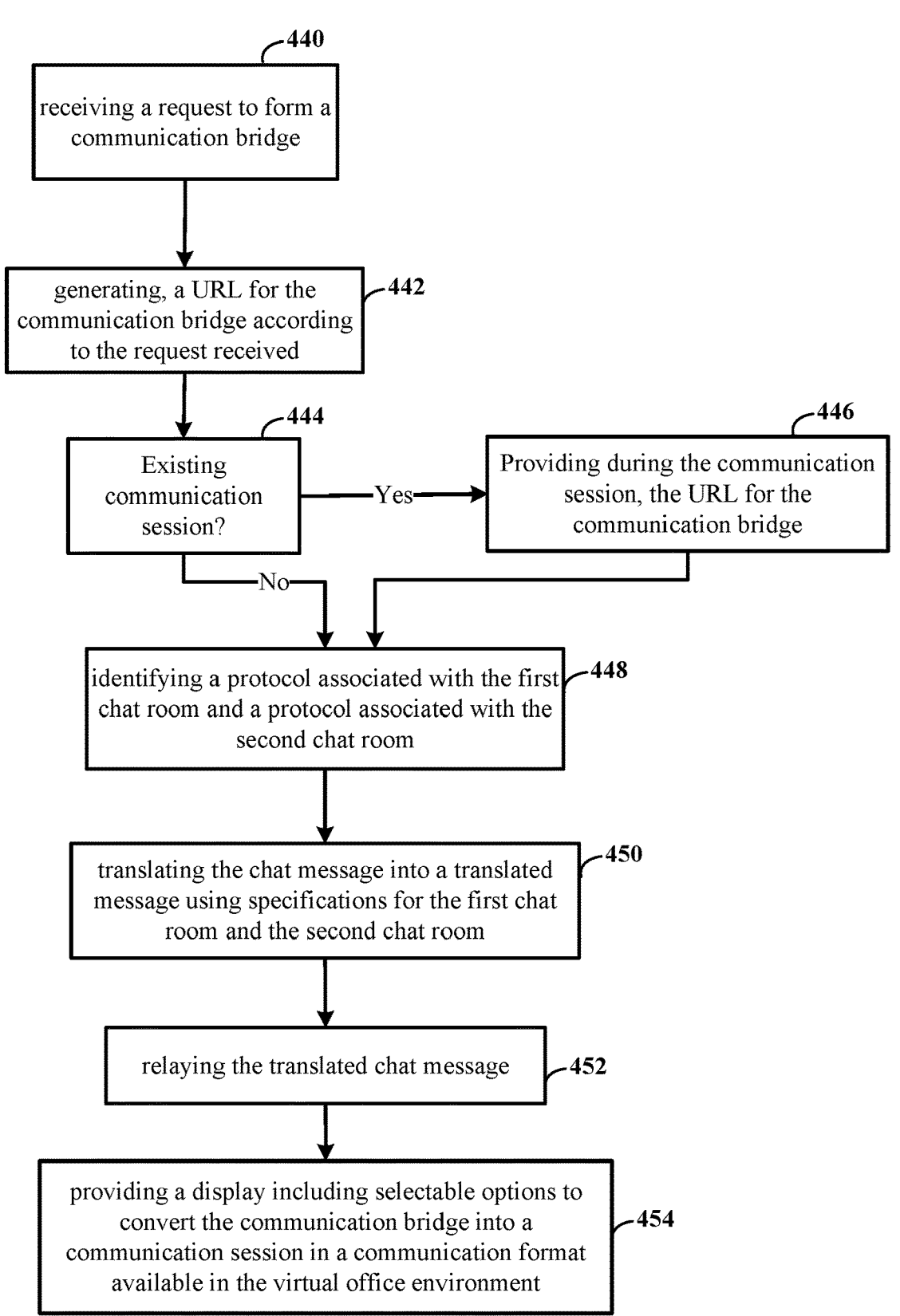
FIG. 4 shows a flow chart of a method facilitating communication between disparate communication platforms accessible by end-users of a communication bridging service.

FIG. 4 shows a flow chart of one example of a method for transmitting chat messages between a plurality of protocol-disparate chat rooms in a virtual office environment, consistent with embodiments of the present disclosure. As illustrated, at block 440 the method includes receiving at a VoIP server (such as VoIP communication server 110 illustrated in FIG. 1), a request to form a communication bridge, such as between a first protocol-disparate chat room including at least two participants and a second protocol-disparate chat room including at least two participants, and using a communication bridging service provided in the virtual office environment. At block 442, the method includes generating a URL for the communication bridge according to the request received from the first participant, as described herein. At block 444, the method includes determining if a communication session already exists between the requested participants. For instance, a voice or video conference can be converted into a chat session, and vice versa. At 446, in response to a determination that a communication session already exists between the participants, the method includes providing during the communication session, the URL for the communication bridge. For instance, if a voice or video communication session already exists, the URL may be provided to the participants during the voice or video communication session. Similarly, at 448, in response to a determination that a communication session does not already exist between the participants, the method continues with identifying a first protocol associated with the first chat room and a second protocol associated with the second chat room. For example, if one group of participants wish to use a first type of chat room, and a second group of participants wish to use a second type of chat room, the method includes identifying protocols for each of the disparate types of chat rooms.

At 450, the method includes translating the chat message into a translated message using specifications for the first chat room and the second chat room, as described herein. Similarly, at block 452, the method includes relaying via the VoIP server, the translated chat message to all chat rooms associated with the communication bridge in real-time or near real-time. At block 454, the method includes providing a display including communication services available in the virtual office environment, and including selectable options to convert the communication bridge into a communication session using a different communication service provided in the virtual office environment. For example, the display can include a unified interface including call monitoring and chat capabilities, as well as video and voice communication capabilities. As described herein, an existing communication session can be converted into a different form of communication session, using the display. For example, an existing chat session, using a communication bridge, can be converted into a voice conference or a video conference, among other examples. Similarly, an existing voice conference or video conference can be converted into a chat session between disparate chat platforms, using the communication bridging service described herein. As described herein, chat messages may be relayed between the chat rooms (e.g., bi-directionally). Although examples herein describe a method of forming a communication bridge between two chat rooms, examples are not necessarily so limited. For instance, as discussed with regard to FIG. 3, communication bridges (e.g., communication bridges) may be formed between a plurality of chat rooms.

End-users may transmit communication (e.g., chat messages) across the communication bridge once the end-users are authenticated. The end-users may be authenticated using encrypted user credentials and a code identifying a communication bridge. For instance, an end-user may be invited to participate in a chat session via a communication bridge, and provided with a code particular to that communication bridge which is used to authenticate the identity of the end-user.

Various example methods include storing metadata associated with the communication bridge in a relational database management system implemented at least in part by a VoIP server. For instance, the VoIP server may interface with a RDMS that stores the metadata. In such examples, the method may include retrieving, via the VoIP server, the stored metadata associated with the communication bridge in response to a full or partial outage by the first chat room or the second chat room, and reestablishing the communication bridge between the first chat room and the second chat room. In such examples, the system is able to recover chat services in situations when one or more chat services 105 experience a full or partial outage.

In some examples, the method includes maintaining, via the VoIP server, a relay account for a plurality of enterprise customers subscribing to the communication bridging service, wherein each respective enterprise customer includes a plurality of end-users and a list of supported chat rooms and the relay account for each respective enterprise customer provides administrative capabilities. In such examples, the method includes forming via the VoIP server and for each end-user of the respective enterprise, an aggregate account that includes all chat rooms associated with the particular end-user. Similarly, the method includes maintaining for each respective relay account, a list of communication bridges formed by end-users of the respective enterprise and authentication data associated with the communication bridges of the enterprise.

An administrative account may provide a privileged account for a particular customer. The administrative account may include a list of customer administrators that have the ability to add or remove customer administrators, and have the ability to view (but not modify) end-user accounts belonging to the customer. Similarly, the administrative account may include the ability to view all communication bridges and portals created with end-user accounts belonging to the customer, and the ability to view all security log events within the customer. Moreover, the administrative account may include the ability to add end-user accounts. Customer administrator may refer to or include a user with email/password or security assertion markup language (SAML) access to the administrative account.

Certain embodiments are directed to a computer program product (e.g., nonvolatile memory device), which includes a machine or computer-readable medium having stored thereon, instructions which may be executed by a computer (or other electronic device) that includes a computer processor circuit to perform these operations/activities. For example, these instructions reflect activities or data flows as may be exemplified in figures, flow charts, and the detailed description.

Various blocks, modules or other circuits may be implemented to carry out one or more of the operations and activities described herein and/or shown in the figures. As examples, the Specification describes and/or illustrates aspects useful for implementing the claimed invention by way of various circuits or circuitry using terms such as blocks, modules, device, system, unit, controller, and the like. In these contexts, a "block" (also sometimes "logic circuitry" or "module") is a circuit that carries out one or more of these or related operations/activities (e.g., a call control circuit). For example, in certain ones of the above-discussed embodiments, one or more modules are discrete logic circuits, computer processing circuits, or programmable logic circuits configured and arranged for implementing these operations/activities, as in the blocks shown in the figures. For example, as may be expressed herein, a "URL generation module" refers to or includes one or more discrete logic circuits, computer processing circuits, or programmable logic circuits configured and arranged for implementing specified operations/activities, whereas the adjective used before "module" is not intended to characterize further structure, but rather to provide antecedent reference. Similarly, it will be apparent that a server refers to and/or includes a computer processing circuit that is configured to provide services to other circuit-based devices, and a (VoIP) endpoint device (or endpoint) refers to and/or includes a communication circuit and (computer) processing circuits which are configured to establish (VoIP) communication sessions with other devices (e.g., personal computers, IP-enabled mobile phones, and tablet computers). In certain embodiments, such circuits can correspond to one or more computer processing circuits programmed to execute a set (or sets) of instructions (and/or configuration data). The instructions (and/or configuration data) can be in the form of software stored in and accessible from a memory circuit, and where such circuits are directly associated with one or more algorithms (or processes), the activities pertaining to such algorithms are not necessarily limited to the specific flows such as shown in the flow charts illustrated in the figures (e.g., where a circuit is programmed to perform the related steps, functions, operations, activities, etc., the flow charts are merely specific detailed examples). The skilled artisan would also appreciate that different (e.g., first and second) modules can include a combination of a central processing unit (CPU) hardware-based circuitry and a set of computer-executable instructions, in which the first module includes a first CPU hardware circuit with one set of instructions and the second module includes a second CPU hardware circuit with another set of instructions.

Based upon the above discussion and illustrations, those skilled in the art will readily recognize that various modifications and changes may be made to the various embodiments without strictly following the exemplary embodiments and applications illustrated and described herein. For example, although aspects and features may in some cases be described in individual figures, it will be appreciated that features from one figure can be combined with features of another figure even though the combination is not explicitly shown or explicitly described as a combination. As another example, although aspects and features may in some cases be described with regard to particular chat rooms, other chat rooms such as IRC, Campfire, Cisco Jabber, Socialcast, Yammer, HipChat, Flowdock, GroupMe, Salesforce Chatter, Lync, iMeet, Planio, Telegram, IRCCloud, Gitter, Fleep, Cisco Spark, Mattermost, Rocket.Chat, and Microsoft Teams, among others may pertain. Such modifications do not depart from the true spirit and scope of various aspects of the disclosure, including aspects set forth in the claims.

What is claimed:

1. A method comprising:
   authenticating users of a first group of user-endpoint devices and users of a second group of user-endpoint devices;
   responsive to the authentication of the users, forming, via a data communications server, a communication bridge between the first group of user-endpoint devices residing in a first collaborative virtual space that uses a first communications format corresponding to a first API communication protocol and the second group of user-endpoint devices residing in a second collaborative virtual space that uses a second communications format corresponding to a second API communication protocol incompatible with the first API communication protocol, wherein the first API communication protocol is associated with one of an audio/video conference and a chat session, and the second API communication protocol is associated with the other of the audio/video conference and the chat session; and
   establishing, via the communication bridge, a communication session that enables the first group of user-endpoint devices, while in the first collaborative virtual space, and the second group of user-endpoint devices, while in the second collaborative virtual space, to collaborative with each other;
   wherein the communication session enables the first group of user-endpoint devices, while in the first virtual space, and the second group of user-endpoint devices, while in the second virtual space, to communicate with each other by, via the communication bridge, receiving a communication sent from one of the first group of user-endpoint devices residing in the first virtual space in accordance with the first communication protocol, translating, the communication into a translated communication compatible with the second communication protocol, and relaying the translated communication to the second group of user-endpoint devices residing in the second virtual space.

2. The method of claim 1, further comprising causing, via communications involving a user interface linked to one of the first group of user-endpoint devices, the communication session to change from the one of audio/video conference and the chat session to the other of the audio/video conference and the chat session.

3. The method of claim 1, further comprising causing, via communications involving a set of client-specific administration settings associated with an authorized client-entity and with one of the first group of user-endpoint devices, the communication session to change from the one of audio/video conference and the chat session to the other of the audio/video conference and the chat session.

4. The method of claim 1, further comprising sharing a uniform resource locator (URL) that is used to facilitate formation of the communication bridge between the first group of user-endpoint devices and the second group of user-endpoint devices.

5. The method of claim 1, wherein the communication bridge is formed in response to a request from a single user.

6. A system comprising:
   a data communications server comprising processing circuitry configured for facilitating communication between a first group of user-endpoint devices residing in a first collaborative virtual space that uses a first communications format corresponding to a first API communication protocol and a second group of user-endpoint devices residing in a second collaborative virtual space that uses a second communications format corresponding to a second API communication protocol incompatible with the first API communication protocol, wherein the first API communication protocol is associated with one of an audio/video conference and a chat session, and the second API communication protocol is associated with the other of the audio/video conference and the chat session, the processing circuitry configured for facilitating communication between the first group of user-endpoint devices and the second group of user-endpoint devices by:
   authenticating users of the first group of user-endpoint devices and users of the second group of user-endpoint devices;
   forming a communication bridge between the first group of user-endpoint devices and the second group of user-endpoint devices responsive to the authentication of the users; and
   establishing, via the communication bridge, a communication session that enables the first group of user-endpoint devices, while in the first collaborative virtual space, and the second group of user-endpoint devices, while in the second collaborative virtual space, to collaborative with each other;
   wherein the processing circuitry is configured for facilitating communication between the first group of user-endpoint devices and the second group of user-endpoint devices by, via the communication bridge, receiving a communication sent from one of the first group of user-endpoint devices residing in the first virtual space in accordance with the first communication protocol, translating, the communication into a translated communication compatible with the second communication protocol, and relaying the translated communication to the second group of user-endpoint devices residing in the second virtual space.

7. The system of claim 6, wherein the processing circuitry is further configured for facilitating communication between the first group of user-endpoint devices and the second group of user-endpoint devices by further causing, via communications involving a user interface linked to one of the first group of user-endpoint devices, the communication session to change from the one of a audio/video conference and the chat session to the other of the audio/video conference and the chat session.

8. The system of claim 6, wherein the processing circuitry is configured for facilitating communication between the first group of user-endpoint devices and the second group of user-endpoint devices by further sharing a uniform resource locator (URL) that is used to facilitate formation of the communication bridge between the first group of user-endpoint devices and the second group of user-endpoint devices.

9. The system of claim 6, further comprising a user interface configured for receiving a request to form the communication bridge from a single user, and the wherein the processing circuitry is configured for forming the communication bridge in response to the request from the single user.

10. A computer-readable device storing computer instructions which, in response to being executed by a processing computer circuit which is part of a data communications server, causes a set of steps to be performed, the set of steps comprising:

sharing a uniform resource locator (URL) between a first group of user-endpoint devices and a second group of user-endpoint devices;

forming, via a data communications server, a communication bridge between a first group of user-endpoint devices residing in a first collaborative virtual space that uses a first communications format corresponding to a first API communication protocol and a second group of user-endpoint devices residing in a second collaborative virtual space that uses a second communications format corresponding to a second API communication protocol incompatible with the first API communication protocol, wherein formation of the communication bridge between the first group of user-endpoint devices and the second group of user-endpoint devices is facilitated by the shared URL, and wherein the first API communication protocol is associated with one of an audio/video conference and a chat session, and the second API communication protocol is associated with the other of the audio/video conference and the chat session; and establishing, via the communication bridge, a communication session that enables the first group of user-endpoint devices, while in the first collaborative virtual space, and the second group of user-endpoint devices, while in the second collaborative virtual space, to collaborative with each other;

wherein the processing circuitry is configured for facilitating communication between the first group of user-endpoint devices and the second group of user-endpoint devices by, via the communication bridge, receiving a communication sent from one of the first group of user-endpoint devices residing in the first virtual space in accordance with the first communication protocol, translating, the communication into a translated communication compatible with the second communication protocol, and relaying the translated communication to the second group of user-endpoint devices residing in the second virtual space.

11. The computer-readable device of claim 10, wherein the set of steps further comprises causing, via communications involving a user interface linked to one of the first group of user-endpoint devices, the communication session to change from the one of audio/video conference and the chat session to the other of the audio/video conference and the chat session.

12. The computer-readable device of claim 10, wherein the communication bridge is formed in response to a request from a single user.

13. The computer-readable device of claim 10, wherein the communication session enables the first group of user-endpoint devices, while in the first virtual space, and the second group of user-endpoint devices, while in the second virtual space, to communicate with each other by, via the communication bridge, receiving a communication sent from one of the first group of user-endpoint devices residing in the first virtual space in accordance with the first communication protocol, translating, the communication into a translated communication compatible with the second communication protocol, and relaying the translated communication to the second group of user-endpoint devices residing in the second virtual space.

14. The system of claim 6, wherein the data communication server is further configured for facilitating communication between the first group of user-endpoint devices and the second group of user-endpoint devices by further causing, via communications involving a set of client-specific administration settings associated with an authorized client-entity and with one of the first group of user-endpoint devices, the communication session to change from the one of audio/video conference and the chat session to the other of the audio/video conference and the chat session.

15. The computer-readable device of claim 10, wherein the set of steps further comprises causing, via communications involving a set of client-specific administration settings associated with an authorized client-entity and with one of the first group of user-endpoint devices, the communication session to change from the one of audio/video conference and the chat session to the other of the audio/video conference and the chat session.

* * * * *